(12) United States Patent
Shioji

(10) Patent No.: US 8,363,120 B2
(45) Date of Patent: Jan. 29, 2013

(54) IMAGE PICK-UP APPARATUS AND IMAGE PICK-UP METHOD FOR SWITCHING A ZOOM RANGE

(75) Inventor: Masahiro Shioji, Neyagawa (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 157 days.

(21) Appl. No.: 12/956,621

(22) Filed: Nov. 30, 2010

(65) Prior Publication Data

US 2011/0128417 A1 Jun. 2, 2011

(30) Foreign Application Priority Data

Nov. 30, 2009 (JP) ................................. 2009-271648

(51) Int. Cl.
*H04N 5/232* (2006.01)
*H04N 3/14* (2006.01)
(52) U.S. Cl. ...................... 348/211.9; 348/294; 348/347
(58) Field of Classification Search ............... 348/208.6, 348/211.9, 240.1, 240.3, 347, 294
See application file for complete search history.

(56) References Cited

U.S. PATENT DOCUMENTS

| | | | | |
|---|---|---|---|---|
| 6,982,755 | B1 * | 1/2006 | Kikuzawa | 348/241 |
| 7,154,542 | B1 * | 12/2006 | Yuki et al. | 348/229.1 |
| 2001/0055066 | A1 * | 12/2001 | Nozawa | 348/240 |
| 2004/0095485 | A1 * | 5/2004 | Ueda et al. | 348/240.1 |
| 2004/0165080 | A1 * | 8/2004 | Burks et al. | 348/222.1 |
| 2007/0257996 | A1 * | 11/2007 | Kurosawa et al. | 348/240.99 |

FOREIGN PATENT DOCUMENTS

| | | |
|---|---|---|
| JP | 2001-197371 A | 7/2001 |
| JP | 2004-072278 A | 3/2004 |
| JP | 2004-172845 A | 6/2004 |

* cited by examiner

*Primary Examiner* — Hung Lam
(74) *Attorney, Agent, or Firm* — Westerman, Hattori, Daniels & Adrian, LLP

(57) ABSTRACT

An apparatus includes a processing portion having a first mode in which one piece of pixel information is output per m-square light receiving portion(s) among light receiving portions in a first region and a second mode in which one piece of pixel information is output per light receiving portions as many as a number calculated by multiplying a square of m by a square of n among light receiving portions in a second region which is a similar figure to the first region at a scaling factor of n times. The apparatus accepts an operation to switch between wide-angle and telephoto, switches the processing portion to the second mode when an operation to switch to wide-angle is accepted and the processing portion to the first mode when an operation to switch to telephoto is accepted, and outputs image information based on the pixel information output from the processing portion.

5 Claims, 9 Drawing Sheets

FIG.4A

| $G_{11}$ | $B_{21}$ | $G_{31}$ | $B_{41}$ | $G_{51}$ | $B_{61}$ | $G_{71}$ | $B_{81}$ |
|---|---|---|---|---|---|---|---|
| $R_{12}$ | $G_{22}$ | $R_{32}$ | $G_{42}$ | $R_{52}$ | $G_{62}$ | $R_{72}$ | $G_{82}$ |
| $G_{13}$ | $B_{23}$ | $G_{33}$ | $B_{43}$ | $G_{53}$ | $B_{63}$ | $G_{73}$ | $B_{83}$ |
| $R_{14}$ | $G_{24}$ | $R_{34}$ | $G_{44}$ | $R_{54}$ | $G_{64}$ | $R_{74}$ | $G_{84}$ |
| $G_{15}$ | $B_{25}$ | $G_{35}$ | $B_{45}$ | $G_{55}$ | $B_{65}$ | $G_{75}$ | $B_{85}$ |
| $R_{16}$ | $G_{26}$ | $R_{36}$ | $G_{46}$ | $R_{56}$ | $G_{66}$ | $R_{76}$ | $G_{86}$ |
| $G_{17}$ | $B_{27}$ | $G_{37}$ | $B_{47}$ | $G_{57}$ | $B_{67}$ | $G_{77}$ | $B_{87}$ |
| $R_{18}$ | $G_{28}$ | $R_{38}$ | $G_{48}$ | $R_{58}$ | $G_{68}$ | $R_{78}$ | $G_{88}$ |

FIG.4B

$G_{11} + G_{31} + G_{13} + G_{33} = G'_{22}$ $R_{12} + R_{32} + R_{14} + R_{34} = R'_{23}$ $B_{21} + B_{41} + B_{23} + B_{43} = B'_{32}$ $G_{22} + G_{42} + G_{24} + G_{44} = G'_{33}$ $\vdots$ $G_{66} + G_{86} + G_{68} + G_{88} = G'_{77}$

FIG.4C

| $G'_{22}$ | $B'_{32}$ | $G'_{62}$ | $B'_{72}$ |
|---|---|---|---|
| $R'_{23}$ | $G'_{33}$ | $R'_{63}$ | $G'_{73}$ |
| $G'_{26}$ | $B'_{36}$ | $G'_{66}$ | $B'_{76}$ |
| $R'_{27}$ | $G'_{37}$ | $R'_{67}$ | $G'_{77}$ |

IMAGE PICK-UP APPARATUS AND IMAGE PICK-UP METHOD FOR SWITCHING A ZOOM RANGE

This nonprovisional application is based on Japanese Patent Application No. 2009-271648 filed with the Japan Patent Office on Nov. 30, 2009, the entire contents of which are hereby incorporated by reference.

BACKGROUND OF THE INVENTION

1. Field of the Invention

The present invention relates to an image pick-up apparatus and an image pick-up method, and particularly to an image pick-up apparatus and an image pick-up method suitable for switching a zoom range.

2. Description of the Related Art

A video camera of which angle of view is switched by turning a turret lens has conventionally been present as a traditional 8-mm video camera. In addition, an angle of view or a zoom range of a digital single-lens camera can be selected by means of a lens system.

Meanwhile, an image pick-up apparatus capable of performing optical zoom processing or electronic zoom processing in response to an operation of a zoom operation button, determining an electronic zoom factor in accordance with an operation of a zoom operation button in the electronic zoom processing, and improving resolution of a video image after electronic zoom by decreasing the number of mixed pixels of charges when the number of mixed pixels of charges is attained in accordance with an electronic zoom factor has been available.

In such an image pick-up apparatus, however, there has been no concept of switching of a zoom range. In addition, since the number of mixed pixels is changed during zooming, a zoomed video image becomes disadvantageously discontinuous at that time point.

SUMMARY OF THE INVENTION

According to one aspect of the present invention, an image pick-up apparatus includes: an image processing portion including an image sensor which outputs pixel information indicating a value specifying a color for each pixel of an image formed by light incident on a light receiving surface constituted of a plurality of light receiving portions and having at least a first mode in which one piece of pixel information is output per light receiving portion(s) as many as a square of a first number among light receiving portions included in a first region of the light receiving surface and a second mode in which one piece of pixel information is output per light receiving portions as many as a number calculated by multiplying the square of the first number by a square of a second number among light receiving portions included in a second region in a figure similar to the first region, at a scaling factor set to the second number; an optical system which guides light incident from the outside to the light receiving surface of the image processing portion; a switching operation portion which accepts an operation to switch between wide-angle and telephoto; a control portion which switches the image processing portion to the second mode when an operation to switch to the wide-angle is accepted by the switching operation portion and switches the image processing portion to the first mode when an operation to switch to the telephoto is accepted; and an output portion which outputs image information based on the pixel information output from the image processing portion to a recording medium or to the outside.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A to 4C are diagrams for illustrating a concept of pixel mixture.

DESCRIPTION OF THE PREFERRED EMBODIMENTS

Figure 1A:
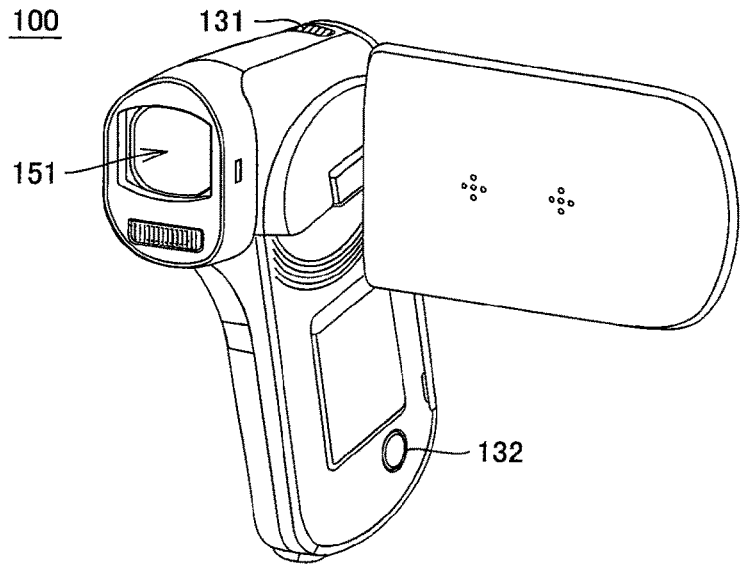
FIGS. 1A to 1C are external views of an image pick-up apparatus in an embodiment of the present invention.

An embodiment of the present invention will be described hereinafter in detail with reference to the drawings. In the drawings, the same or corresponding elements have the same reference characters allotted and description thereof will not be repeated.

Figure 1B:
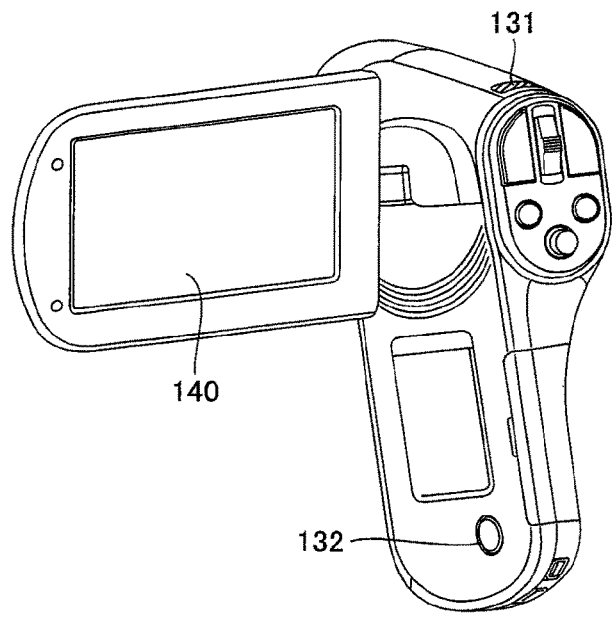
Figure 1C:
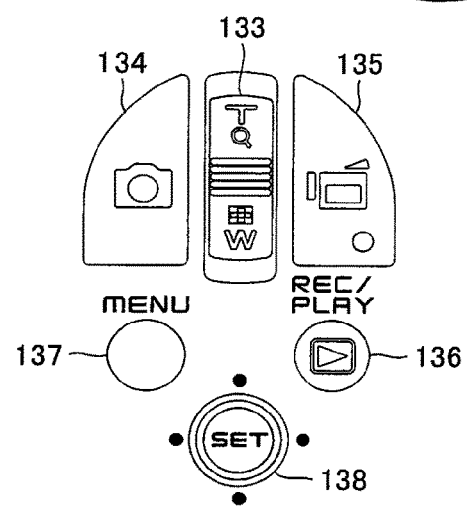

FIGS. 1A to 1C are external views of an image pick-up apparatus 100 in an embodiment of the present invention. FIG. 1A is an external view when image pick-up apparatus 100 is viewed from a lens side. FIG. 1B is an external view when image pick-up apparatus 100 is viewed from an operation panel side. FIG. 1C is an enlarged view of the operation panel of image pick-up apparatus 100. Referring to FIGS. 1A to 1C, description will be given in this embodiment assuming that image pick-up apparatus 100 is a digital movie camera.

Any other apparatus, however, may be adopted as image pick-up apparatus 100, so long as an apparatus incorporates an area image sensor such as a CCD (Charge Coupled Device) image sensor or a CMOS (Complementary Metal Oxide Semiconductor) image sensor, without limitation. For example, a digital still camera or a portable communication terminal having a still camera function or a video camera function may be employed.

Image pick-up apparatus 100 is mainly constituted of a main body portion including an optical system 151 such as a lens and a monitor unit portion including a display portion 140. On a side surface of the main body portion in contact with the monitor unit portion at the time when the monitor unit portion is folded toward the main body portion, a power button 132 for switching between power ON and OFF is provided. On an upper surface of the main body portion on the operation panel side, a zoom range button 131 for switching a zoom range between wide-angle and telephoto is provided.

In the operation panel, a zoom switch 133 for gradually zooming toward wide-angle or telephoto, a photo button 134 for shooting a still image, a movie button 135 for starting or stopping recording of a motion picture, a REC/PLAY button 136 for switching between a shooting mode and a reproduction mode, a menu button 137 for switching to various setting modes, and a set button 138 for performing a selection operation by moving in up/down/left/right direction in making various types of setting and performing an enter operation by pressing are provided.

Figure 2:
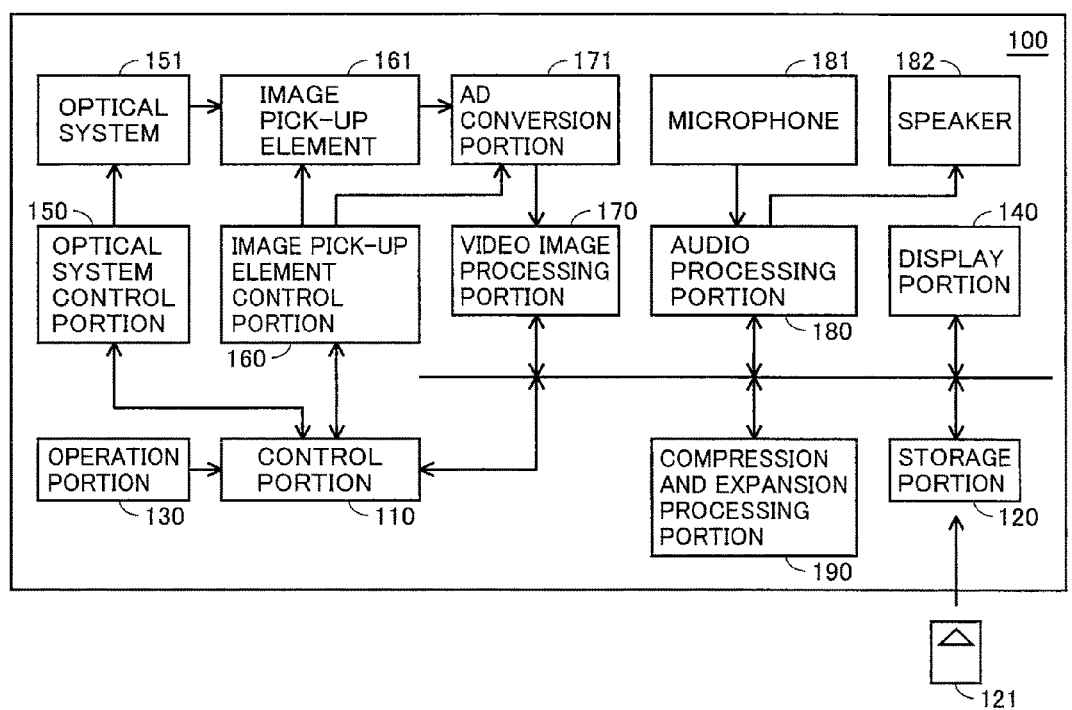
FIG. 2 is a block diagram showing overview of a configuration of the image pick-up apparatus in this embodiment.
Figure 3:
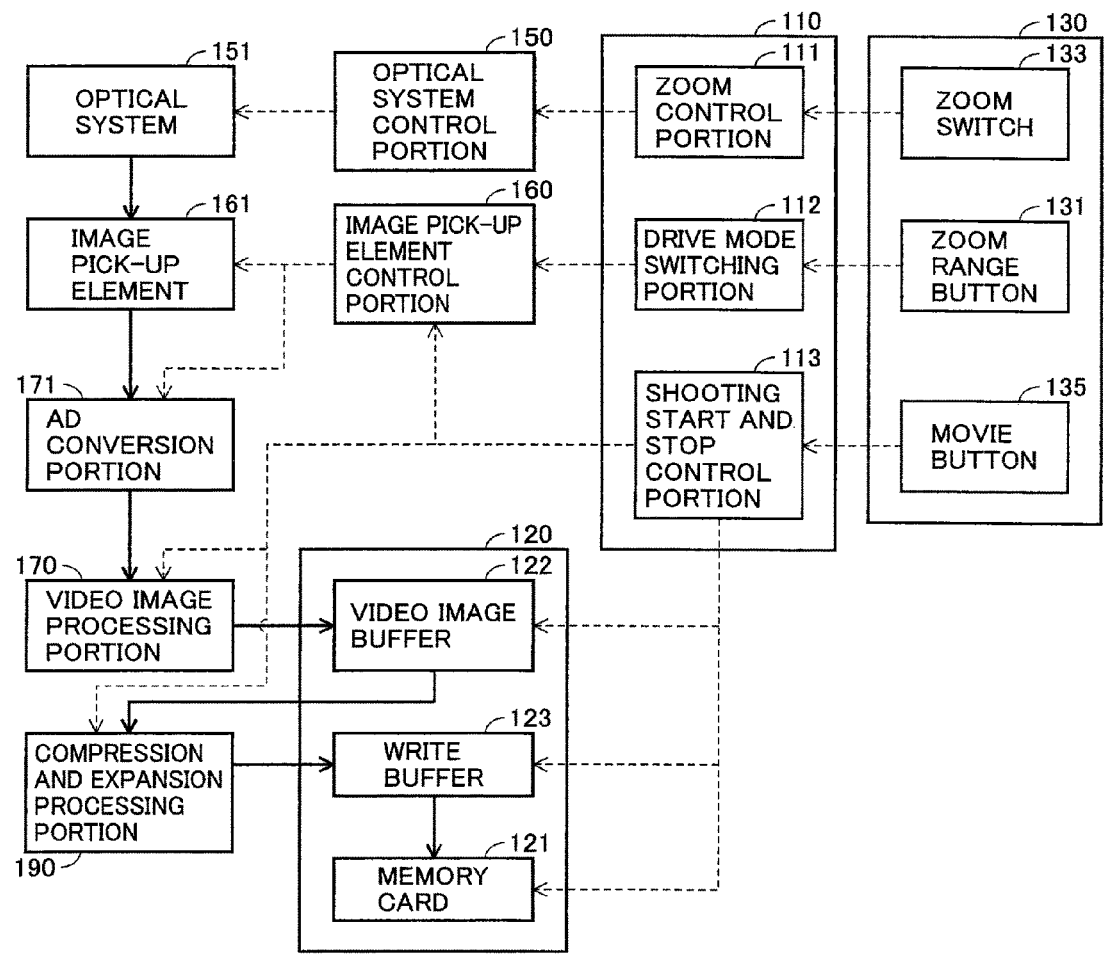
FIG. 3 is a data-flow diagram showing flow of a signal in the image pick-up apparatus in this embodiment.

FIG. 2 is a block diagram showing overview of a configuration of image pick-up apparatus 100 in this embodiment. FIG. 3 is a data-flow diagram showing flow of a signal in image pick-up apparatus 100 in this embodiment. It is noted that a solid arrow indicating flow represents a signal relating to an image and a dashed arrow represents a signal relating to control. Initially, a configuration of image pick-up apparatus 100 and an operation of each portion of image pick-up apparatus 100 for shooting a video image will be described.

Referring to FIGS. 2 and 3, image pick-up apparatus 100 includes a control portion 110, a storage portion 120, an operation portion 130, display portion 140, an optical system control portion 150, optical system 151, an image pick-up element control portion 160, an image pick-up element 161, a video image processing portion 170, an AD (Analog Digital) conversion portion 171, an audio processing portion 180, a microphone 181, a speaker 182, and a compression and expansion processing portion 190.

Operation portion 130 transmits an operation signal from power button 132, zoom range button 131 and various buttons on the operation panel described with reference to FIGS. 1A to 1C to control portion 110.

Storage portion 120 includes a non-volatile memory such as a ROM (Read Only memory) (for example, a flash memory) and a volatile memory such as a RAM (Random Access Memory) (for example, an SDRAM (synchronous Dynamic Random Access Memory)) as well as a memory card slot for reading and writing data from and into a memory card 121 (for example, an SD memory card and a USB memory).

It is noted that storage portion 120 may include other internal storage devices such as a hard disk drive, in addition to or instead of a semiconductor memory such as a non-volatile memory and a volatile memory. In addition, storage portion 120 may include other external storage devices such as a device reading and writing data from and into a recording medium such as an optical disc (for example, a DVD (Digital Versatile Disc) and a BD (Blu-ray Disc)), in addition to or instead of the memory card slot.

Storage portion 120 stores data of a program for controlling image pick-up apparatus 100, data for controlling image pick-up apparatus 100, setting data for setting various functions of image pick-up apparatus 100, data of a still image or a motion picture picked up by image pick-up apparatus 100, and the like.

Further, storage portion 120 is used as a work memory when a program is executed, a buffer memory when image pick-up processing is performed, and the like.

Control portion 110 includes a CPU (Central Processing Unit), and controls storage portion 120, display portion 140, optical system control portion 150, image pick-up element control portion 160, video image processing portion 170, audio processing portion 180, and compression and expansion processing portion 190, in response to an operation signal from operation portion 130, in accordance with a program for controlling image pick-up apparatus 100 that is stored in storage portion 120.

Optical system 151 includes a plurality of lenses, a diaphragm, and an actuator for changing a position of a lens and an aperture of the diaphragm. Optical system 151 guides light incident from an external subject, a background thereof or the like toward a light receiving surface of image pick-up element 161.

The actuator of optical system 151 changes a zoom factor of an image formed on the light receiving surface of image pick-up element 161, adjusts focus on the light receiving surface, and restricts a quantity of light incident on the light receiving surface within a prescribed range, by adjusting a position of a lens and an aperture of the diaphragm, in response to a control signal from optical system control portion 150.

Optical system control portion 150 controls the actuator of optical system 151 in response to a control signal from control portion 110, so as to change a zoom factor and focus of an image formed on image pick-up element 161 and a quantity of light incident on image pick-up element 161.

For example, when zoom switch 133 is operated toward telephoto or wide-angle, operation portion 130 transmits an operation signal to that effect to control portion 110. A zoom control portion 111 implemented in control portion 110 as a result of execution of a program by the CPU of control portion 110 transmits a control signal for gradually increasing or decreasing a zoom factor of optical zoom to optical system control portion 150, upon receiving the operation signal indicating zoom toward telephoto or wide-angle.

When a control signal for gradually increasing a zoom factor of optical zoom is transmitted from control portion 110, optical system control portion 150 transmits a control signal for making gradual transition of an angle of view of optical system 151 to telephoto to the actuator of optical system 151, and when a control signal for gradually decreasing a zoom factor is transmitted, optical system control portion 150 transmits a control signal for making gradual transition of an angle of view of optical system 151 to wide-angle to the actuator of optical system 151. The actuator of optical system 151 moves a position of a lens so as to make gradual transition of an angle of view of optical system 151 toward telephoto or wide-angle, in response to the control signal from optical system control portion 150.

Image pick-up element 161 is an area image sensor having a light receiving surface in which a plurality of light receiving portions each including one photodiode detecting light and generating charge are two-dimensionally arranged, and it is a CCD image sensor in the present embodiment. It is noted that image pick-up element 161 may be a CMOS image sensor.

Under the control of image pick-up element control portion 160, image pick-up element 161 accumulates an image formed on the light receiving surface by light incident from optical system 151 as charges, as a result of photoelectric conversion in accordance with brightness and darkness of light of the image for each light receiving portion, successively converts an amount of charge for each light receiving portion into a voltage in accordance with a drive pulse from image pick-up element control portion 160, and outputs a variation in such a voltage as an electric signal.

In addition, for light receiving portions of image pick-up element 161 in the present embodiment, color filters of G (Green), R (Red), B (Blue), and G, that is, what is called color filters in Bayer arrangement, are provided for four respective light receiving portions. Thus, light that has passed through the color filter of each color is incident on each light receiving portion, and a voltage signal relating to each color component is output from image pick-up element 161.

It is noted that the color filter is not limited to the color filter in Bayer arrangement, and other color filters such as a primary color filter in other arrangement and a complementary color filter may be adopted. Alternatively, image pick-up element 161 is not limited to an image pick-up element provided with a color filter for each light receiving portion and detecting each color component at each light receiving portion like a color filter in Bayer arrangement used in the present embodiment, and it may be an image pick-up element in which each light receiving portion is constituted of a plurality of layers and each layer detects each color component.

Under the control of image pick-up element control portion 160, AD conversion portion 171 quantizes an analog electric signal from image pick-up element 161 and converts the signal into a digital image signal.

Image pick-up element control portion 160 supplies a clock signal to image pick-up element 161 and an AD conversion portion 171 or switches a drive mode of image pick-up element 161, in response to a control signal from control portion 110.

For example, when zoom range button 131 is operated, operation portion 130 transmits an operation signal to that effect to control portion 110. A drive mode switching portion 112 implemented in control portion 110 as a result of execution of a program by the CPU of control portion 110 transmits a control signal for switching the drive mode of image pick-up element 161 to image pick-up element control portion 160, upon receiving the operation signal indicating the operation of zoom range button 131.

Receiving the control signal for switching the drive mode of image pick-up element 161, image pick-up element control portion 160 switches the drive mode of image pick-up element 161. Image pick-up element 161 outputs an electric signal in accordance with the switched drive mode. The drive mode will be described later.

Here, pixel mixture in image pick-up element 161 will be described. FIGS. 4A to 4C are diagrams for illustrating a concept of pixel mixture. Referring to FIGS. 4A to 4C, arrangement of color filters of image pick-up element 161 in the present embodiment is adapted to Bayer arrangement described previously, as shown in FIG. 4A. In FIGS. 4A to 4C, each reference sign indicates a value of charge of each light receiving portion.

Here, a case of mixing four pixels for adding charges of four light receiving portions will be described. In this case, charges in four neighboring light receiving portions having color filters of the same color respectively are added and converted to a voltage, which is in turn output as an electric signal.

In the present embodiment, assuming 2×2 or four adjacent light receiving portions having color filters of G, R, B, and G respectively as one set, four neighboring light receiving portions having color filters common in color refer to four light receiving portions located at the same position in 2×2 or four adjacent sets.

Specifically, sets of light receiving portions of {G11, R12, B21, G22}, {G13, R14, B23, G24}, {G31, R32, B41, G42}, and {G33, R34, B43, G44} are each assumed as one set. These sets are 2×2 or four adjacent sets. In this case, sets of four neighboring light receiving portions common in color of the color filter are {G11, G13, G31, G33}, {R12, R14, R32, R34}, {B21, B23, B41, B43}, and {G22, G24, G42, G44}, respectively.

Then, as shown in FIG. 4B, charges of four neighboring light receiving portions common in color of the color filter are added, and four charges of G'22, R'23, B'32, and G'33 as added as shown in FIG. 4C are converted to a voltage, which is in turn output as an electric signal.

Namely, an image formed on the light receiving surface with the same area is output as an electric signal corresponding to ¼ of the number of pixels, with a voltage range of each pixel being converted to four times, as compared with an electric signal that is output when four pixels are not mixed.

Figure 5:
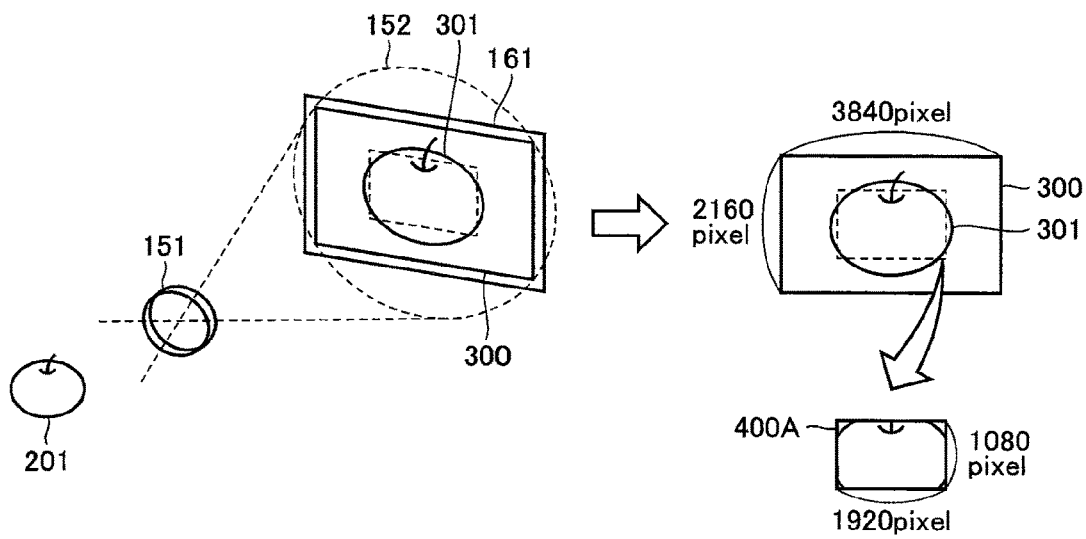
FIG. 5 is a first diagram for illustrating an image obtained by an image sensor in this embodiment.
Figure 6:
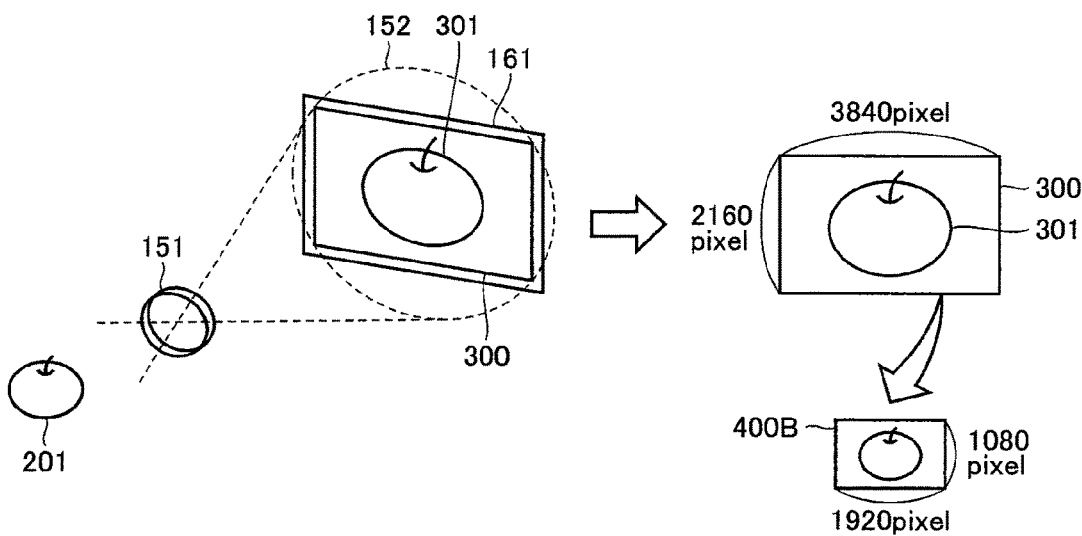
FIG. 6 is a second diagram for illustrating an image obtained by the image sensor in this embodiment.

In the present embodiment, image pick-up element 161 has at least a first mode and a second mode as the drive modes. FIG. 5 is a first diagram for illustrating an image obtained by an image sensor in this embodiment. FIG. 6 is a second diagram for illustrating an image obtained by the image sensor in this embodiment.

Referring to FIG. 5, light incident from the outside of image pick-up apparatus 100 through optical system 151 forms an image within a range of an image circle 152 at a focal length of optical system 151. The light incident from a subject 201 through optical system 151 forms an image 301 on a light receiving surface 300 of image pick-up element 161 provided at the focal length of optical system 151.

The first mode is a cut-out mode in which electric signals obtained by aligning in the order of scanning, voltages corresponding to charges of respective light receiving portions included in a first region (a rectangular region surrounded by a dashed line inside light receiving surface 300 in FIG. 5) constituted of H×V (in the present embodiment, H=1920 and V=1080) light receiving portions in the center of light receiving surface 300 constituted of 3840×2160 light receiving portions are output. In other words, the cut-out mode refers to a mode in which an electric signal obtained by aligning in the order of scanning, a voltage corresponding to charge of a light receiving portion as many as a square of 1, per light receiving portion as many as the square of 1 included in the first region, is output.

An image 400A represented by the electric signal output in the first mode has a size of 1920×1080 pixels, and image 301 of subject 201 is included as occupying a large range of image 400A. Namely, image 400A as subject 201 being shot with telephoto is output.

The second mode refers to a 4-pixel mixed mode described with reference to FIGS. 4A to 4C, in which electric signals obtained by aligning in the order of scanning, voltages corresponding to added charges of light receiving portions as many as a square of 2, per light receiving portions as many as the square of 2 included in a second region (a rectangular region surrounded by a dashed line outside light receiving surface 300 in FIG. 6) constituted of 2H×2V (in the present embodiment, 3840×2160; that is, the range the same as the light receiving surface) light receiving portions in the center of light receiving surface 300 constituted of 3840×2160 light receiving portions, are output.

An image 400B represented by the electric signals output in the second mode has a size of 1920×1080 pixels, and image 301 of subject 201 is included as occupying a small range of image 400B, as compared with the size of image 301 included in image 400A. Namely, image 400B as subject 201 being shot with wide-angle is output.

The second region is a figure similar to the first region, at a scaling factor of 2×. In addition, preferably, the first region and the second region are identical in a central point.

Referring back to FIGS. 2 and 3, video image processing portion 170 converts a digitized image signal of Bayer pattern from AD conversion portion 171 into an RGB signal, performs gradation correction processing such as gamma correction, converts the RGB signal to a YCbCr signal, or causes a video image buffer 122 in storage portion 120 to temporarily store the YCbCr signal, in response to a control signal from control portion 110. In addition, video image processing portion 170 may perform other processing for correcting an image.

Microphone 181 converts external voice and sound into an electric signal represented by variation in a voltage and transmits the signal to audio processing portion 180.

Audio processing portion 180 quantizes an analog electric signal from microphone 181 so as to convert the signal into a digital audio signal, and causes a buffer in storage portion 120 to store the digital audio signal, in response to a control signal from control portion 110. In addition, audio processing portion 180 converts an audio signal expanded by compression and expansion processing portion 190 into an analog electric signal and outputs the analog electric signal to speaker 182, in response to a control signal from control portion 110.

Speaker 182 converts the electric signal output from audio processing portion 180 into voice and sound and outputs the voice and sound to the outside.

Compression and expansion processing portion 190 reads the YCbCr signal stored in video image buffer 122 in storage portion 120, reads also the audio signal in the buffer in storage portion 120, compresses the read YCbCr signal and audio signal so as to convert the signals into video image data in the MPEG-4 (Moving Picture Experts Group phase 4) format, and causes a write buffer 123 in storage portion 120 to store the video image data, in response to a control signal from control portion 110.

Control portion 110 causes memory card 121 to store the video image data stored in write buffer 123 in storage portion 120.

For example, when movie button 135 is operated, operation portion 130 transmits an operation signal to that effect to control portion 110. A shooting start and stop control portion 113 implemented in control portion 110 as a result of execution of a program by the CPU of control portion 110 carries out control to stop shooting if a motion picture is being shot and carries out control to start shooting if a motion picture is not being shot, upon receiving the operation signal indicating the operation of movie button 135.

Specifically, as control to start shooting, a control signal is transmitted to image pick-up element control portion 160 so that the image pick-up element outputs an electric signal in accordance with setting for shooting, and each buffer in video image processing portion 170, compression and expansion processing portion 190 and storage portion 120 is controlled so as to start processing for shooting.

Display portion 140 includes a display apparatus (for example, an LCD (Liquid Crystal Display)) and displays a video image processed by video image processing portion 170 or a video image stored in memory card 121 or the like in storage portion 120, as well as indication indicating a state of image pick-up apparatus 100 (for example, a remaining period of time for shooting, a state of charge of a battery, and the like) over such a video image, various menu screens (for example, a screen for setting various setting values, a screen for selecting a video image to be reproduced, and the like), and the like.

Figure 7:
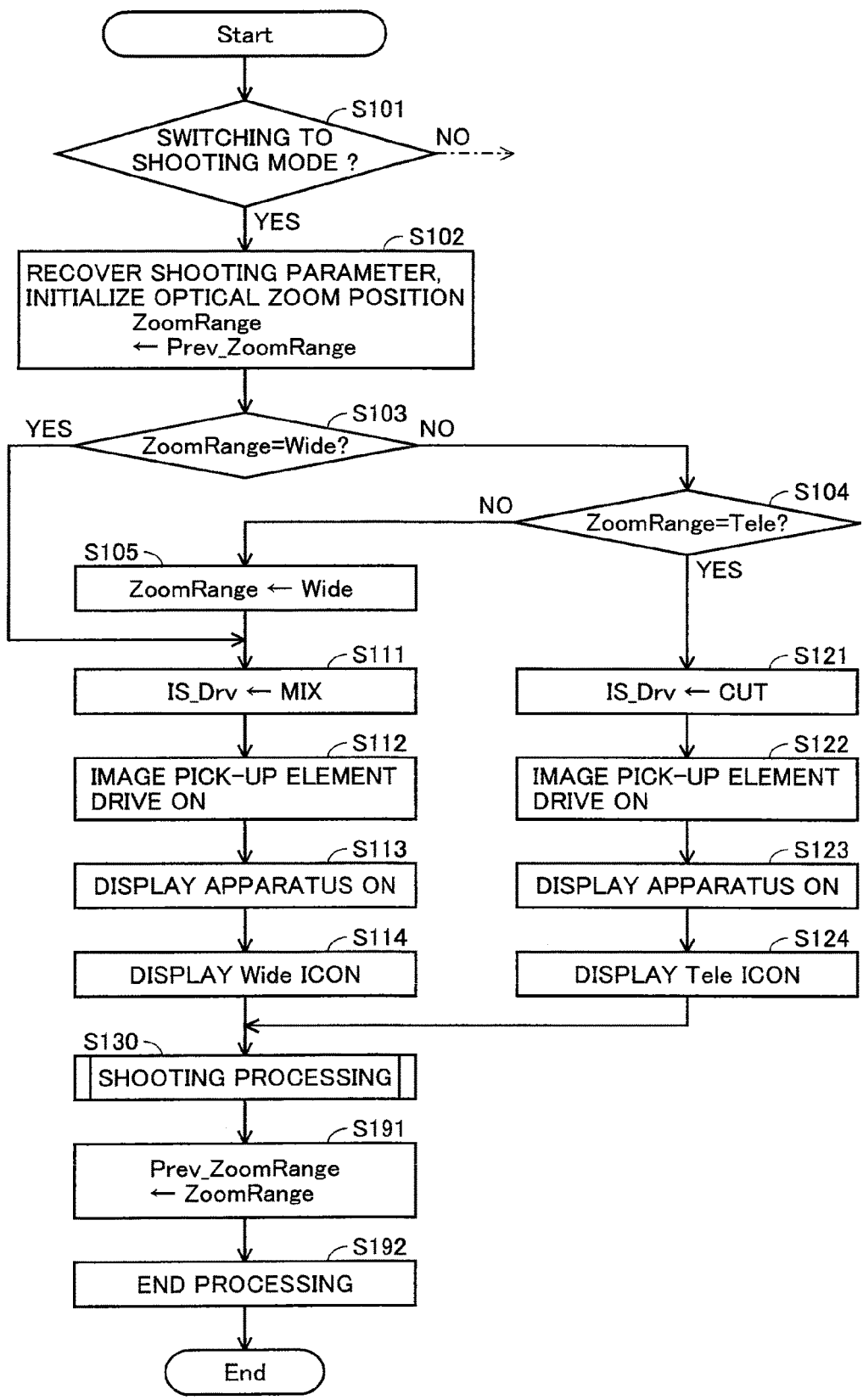
FIG. 7 is a flowchart showing a flow of main processing performed by the image pick-up apparatus in this embodiment.

FIG. 7 is a flowchart showing a flow of main processing performed by image pick-up apparatus 100 in this embodiment. Referring to FIG. 7, initially, in step S101, the CPU of control portion 110 determines whether switching to a shooting mode has been made or not, in response to transmission of an operation signal indicating the operation of REC/PLAY button 136 from operation portion 130.

When it is determined that switching to the shooting mode has not been made (NO in step S101), the CPU performs processing other than processing in a case where switching to the shooting mode has been made.

On the other hand, when it is determined that switching to the shooting mode has been made (YES in step S101), the CPU recovers in step S102, a shooting parameter which is a setting value for shooting, from storage portion 120. In addition, the CPU initializes a position of optical zoom. Moreover, the CPU sets a value indicated by a variable Prev_ZoomRange indicating whether the zoom range at the time of previous end was set to wide-angle or telephoto as a variable ZoomRange indicating whether the current zoom range is set to wide-angle or telephoto.

It is noted that a value indicated by variable ZoomRange or Prev_ZoomRange is any of Wide indicating that the zoom range is set to wide-angle and Tele indicating that the zoom range is set to telephoto. In addition, at least variable Prev_ZoomRange is stored in an area of a non-volatile memory of storage portion 120. Thus, even when power of image pick-up apparatus 100 is turned off, the value for variable Prev_ZoomRange can be used next time the power is turned on.

Then, in step S103, the CPU determines whether the value for variable ZoomRange is set to Wide or not. When it is determined that Wide is not set (NO in step S103), the CPU determines in step S104 whether the value for variable ZoomRange is set to Tele or not. When it is determined that Tele is not set (NO in step S104), that is, when the recovered value for ZoomRange is undefined for some reason, the CPU sets in step S105, value Wide as variable ZoomRange.

When it is determined in step S103 that Wide is set (determination as YES is made) and after step S105, in step S111, the CPU sets a value MIX indicating the 4-pixel mixed mode as a variable Is_Drv indicating the drive mode of image pick-up element 161 and transmits a control signal for setting the drive mode of image pick-up element 161 to the 4-pixel mixed mode to image pick-up element control portion 160. Image pick-up element control portion 160 switches the drive mode of image pick-up element 161 to the 4-pixel mixed mode in response to this control signal.

Then, in step S112, the CPU transmits a control signal to start drive of image pick-up element 161 to image pick-up element control portion 160.

Image pick-up element control portion 160 starts driving image pick-up element 161 in response to this control signal. Thus, image pick-up element 161 outputs an electric signal to AD conversion portion 171 in the 4-pixel mixed mode. AD conversion portion 171 converts the electric signal from image pick-up element 161 to a digital image signal. Video image processing portion 170 converts the image signal from AD conversion portion 171 to the YCbCr signal. Compression and expansion processing portion 190 converts the YCbCr signal into video image data in the MPEG-4 format. Control portion 110 causes memory card 121 to store the video image data converted by compression and expansion processing portion 190.

Then, in step S113, the CPU transmits to display portion 140, a control signal for displaying a video image being shot on the display apparatus of display portion 140. Display portion 140 starts display on the display apparatus, of the video image represented by the YCbCr signal from video image processing portion 170, in response to this control signal.

Then, in step S114, the CPU transmits to display portion 140, a control signal for causing the display apparatus of display portion 140 to display a Wide icon indicating that the zoom range is set to wide-angle. Display portion 140 displays the Wide icon on the display apparatus in response to this control signal. Thereafter, the process proceeds to step S130.

On the other hand, when it is determined in step S104 that Tele is set (determination as YES is made), in step S121, the CPU sets a value CUT indicating the cut-out mode as variable Is_Drv and transmits to image pick-up element control portion 160, a control signal for setting the drive mode of image pick-up element 161 to the cut-out mode. Image pick-up element control portion 160 switches the drive mode of image pick-up element 161 to the cut-out mode in response to this control signal.

Then, in step S122, the CPU transmits a control signal to start driving image pick-up element 161 to image pick-up element control portion 160. Image pick-up element control portion 160 starts driving image pick-up element 161 in response to this control signal. Thus, image pick-up element 161 outputs an electric signal to AD conversion portion 171 in the cut-out mode. The subsequent flow of the signal is the same as that described in connection with step S112.

Then, in step S123, the CPU transmits to display portion 140, a control signal for displaying a video image being shot on the display apparatus of display portion 140. An operation of display portion 140 is the same as the operation described in connection with step S113.

Then, in step S124, the CPU transmits to display portion 140, a control signal for causing the display apparatus of display portion 140 to display a Tele icon indicating that the zoom range is set to telephoto. Display portion 140 displays the Tele icon on the display apparatus in response to this control signal. Thereafter, the process proceeds to step S130.

In step S130, the CPU performs shooting processing. The shooting processing will be described later with reference to FIG. 8.

After the shooting processing ends, in step S191, the CPU sets the value for variable ZoomRange as variable Prev_ZoomRange. Next time image pick-up apparatus 100 is switched to the shooting mode, the value for ZoomRange can be set to a value the same as the previous value.

Then, in step S192, the CPU performs processing necessary before turning off power of image pick-up apparatus 100 and thereafter turns off power.

Figure 8:
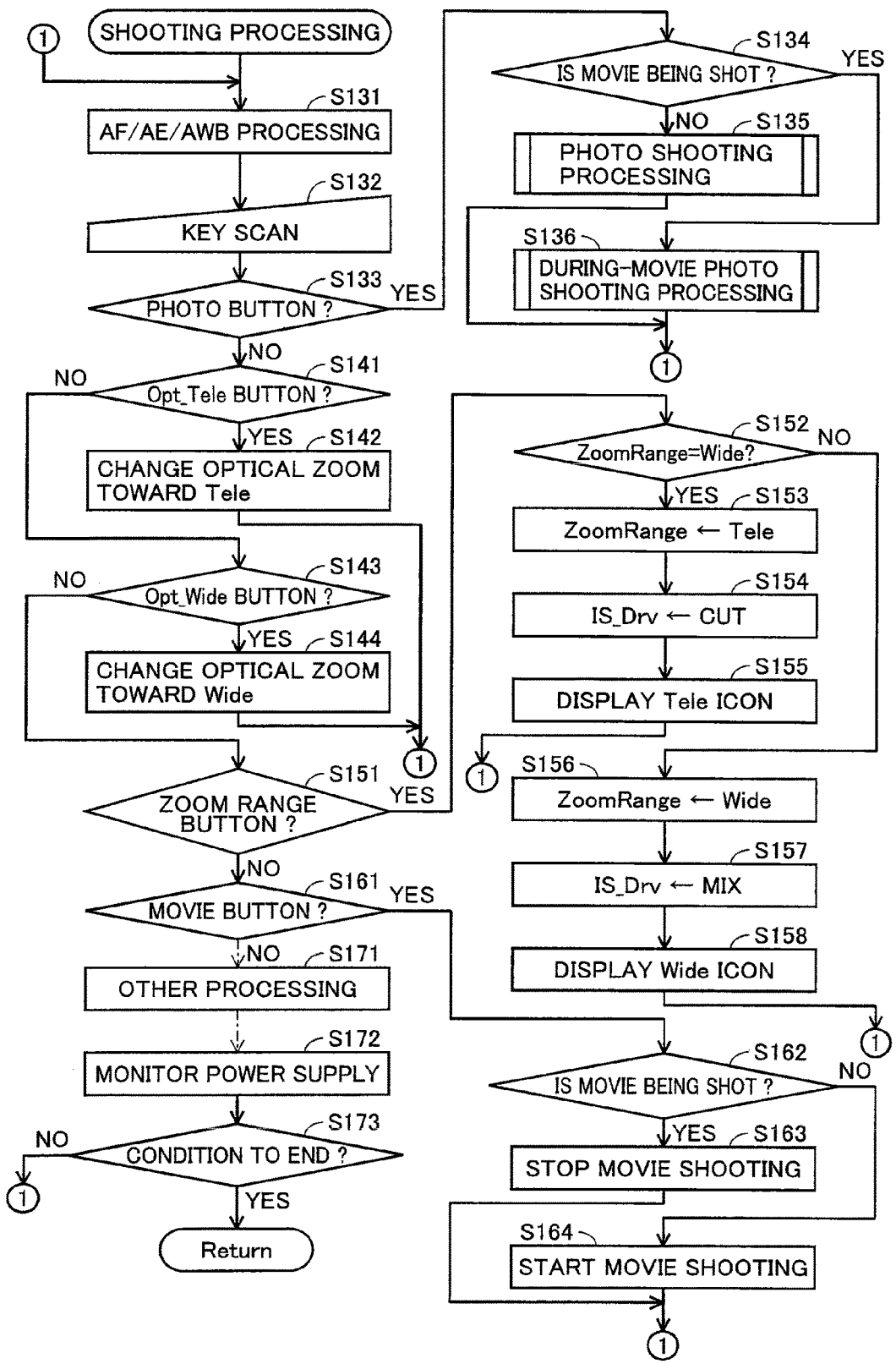
FIG. 8 is a flowchart showing a flow of shooting processing performed by the image pick-up apparatus in this embodiment.

FIG. 8 is a flowchart showing a flow of the shooting processing performed by image pick-up apparatus 100 in this embodiment. This shooting processing is processing performed in step S130 in the main processing described with reference to FIG. 7.

Referring to FIG. 8, initially, in step S131, the CPU of control portion 110 performs processing for autofocus, autoexposure, and automatic white balance, by transmitting a control signal to optical system control portion 150, image pick-up element control portion 160, video image processing portion 170, and the like.

Then, in step S132, the CPU checks key scan, that is, whether an operation signal indicating the operation of any button or switch is received from operation portion 130 or not. In the present flowchart, key scan is performed in the flow of the processing, however, key scan is actually performed as interrupt processing.

In step S133, the CPU determines whether the operation of photo button 134 has been confirmed or not as a result of key scan. When it is determined that the operation of photo button 134 has been confirmed (YES in step S133), the CPU determines in step S134 whether movie is being shot or not.

When it is determined that movie is not being shot (NO in step S134), the CPU performs in step S135 photo shooting processing for shooting a still image. Thereafter, the CPU returns the processing to be performed to the processing in step S131.

On the other hand, when it is determined that movie is being shot (YES in step S134), the CPU performs in step S136 during-movie photo shooting processing for shooting a still image during shooting of a motion picture. Thereafter, the CPU returns the processing to be performed to the processing in step S131.

When it is determined in step S133 that the operation of photo button 134 has not been confirmed (determination as NO is made), the CPU determines in step S141 whether the operation of zoom switch 133 toward telephoto has been confirmed or not as a result of key scan. When it is determined that the operation toward telephoto has been confirmed (YES in step S141), the CPU transmits in step S142 a control signal for changing the optical zoom toward telephoto to optical system control portion 150. Thereafter, the CPU returns the processing to be performed to the processing in step S131.

When optical system control portion 150 received the control signal for changing the optical zoom toward telephoto from the CPU of control portion 110, optical system control portion 150 transmits to the actuator of optical system 151, a control signal for making gradual transition of an angle of view of optical system 151 toward telephoto. The actuator of optical system 151 moves a position of a lens so as to make gradual transition of an angle of view of optical system 151 toward telephoto, in response to the control signal from optical system control portion 150.

When it is determined in step S141 that the operation of zoom switch 133 toward telephoto has not been confirmed (determination as NO is made), the CPU determines in step S143 whether the operation of zoom switch 133 toward wide-angle has been confirmed or not as a result of key scan. When it is determined that the operation toward wide-angle has been confirmed (YES in step S143), the CPU transmits in step S144 a control signal for changing the optical zoom toward wide-angle to optical system control portion 150. Thereafter, the CPU returns the processing to be performed to the processing in step S131.

When optical system control portion 150 received the control signal for changing the optical zoom toward wide-angle from the CPU of control portion 110, optical system control portion 150 transmits to the actuator of optical system 151, a control signal for making gradual transition of an angle of view of optical system 151 toward wide-angle. The actuator of optical system 151 moves a position of a lens so as to make gradual transition of an angle of view of optical system 151 toward wide-angle, in response to the control signal from optical system control portion 150.

When it is determined in step S143 that the operation of zoom switch 133 toward wide-angle has not been confirmed (determination as NO is made), the CPU determines in step S151 whether the operation of zoom range button 131 has been confirmed or not as a result of key scan.

When it is determined that the operation of zoom range button 131 has been confirmed (YES in step S151), the CPU determines in step S152 whether the value for variable ZoomRange is set to Wide or not. When it is determined that Wide is set (YES in step S152), the CPU changes in step S153 the value for variable ZoomRange to Tele. Namely, when the zoom range has been set to wide-angle, switching to telephoto is made.

Then, in step S154, a control signal for changing the value for variable Is_Drv to CUT and for setting the drive mode of image pick-up element 161 to the cut-out mode is transmitted to image pick-up element control portion 160. Image pick-up element control portion 160 switches the drive mode of image pick-up element 161 to the cut-out mode in response to this control signal.

Then, in step S155, the CPU transmits to display portion 140, a control signal for causing the display apparatus of display portion 140 to display the Tele icon indicating that the zoom range is set to telephoto. Display portion 140 displays the Tele icon on the display apparatus in response to this control signal. Thereafter, the process proceeds to step S131.

When it is determined that the value for variable Zoom-Range is not set to Wide (NO in step S152), the CPU changes in step S156 the value for variable ZoomRange to Wide. Namely, when the zoom range has been set to telephoto, switching to wide-angle is made.

Then, in step S157, a control signal for changing the value for variable Is_Drv to MIX and for setting the drive mode of image pick-up element 161 to the 4-pixel mixed mode is transmitted to image pick-up element control portion 160. Image pick-up element control portion 160 switches the drive mode of image pick-up element 161 to the 4-pixel mixed mode in response to this control signal.

Then, in step S158, the CPU transmits to display portion 140, a control signal for causing the display apparatus of display portion 140 to display the Wide icon indicating that the zoom range is set to wide-angle. Display portion 140 displays the Wide icon on the display apparatus in response to this control signal. Thereafter, the process proceeds to step S131.

When it is determined in step S151 that the operation of zoom range button 131 has not been confirmed (determination as NO is made), the CPU determines in step S161 whether the operation of movie button 135 has been confirmed or not as a result of key scan.

When it is determined that the operation of movie button 135 has been confirmed (YES in step S161), the CPU determines in step S162 whether movie is being shot or not.

When it is determined that movie is being shot (YES in step S162), the CPU carries out in step S163 control for stopping shooting of a motion picture. Thereafter, the CPU returns the processing to be performed to the processing in step S131.

On the other hand, when it is determined that movie is not being shot (NO in step S162), the CPU carries out in step S164 control to start shooting a motion picture. Thereafter, the CPU returns the processing to be performed to the processing in step S131.

When it is determined in step S161 that the operation of movie button 135 has not been confirmed (determination as NO is made), the CPU performs in step S171 other processing. Then, in step S172, the CPU monitors power supply in order to check an operation condition of a battery or the like, such as a state of charge of the battery.

Then, in step S173, the CPU determines whether a condition to end has been satisfied or not, as a result of reception of an operation signal indicating the operation of power button 132 from operation portion 130. When it is determined that the condition to end is not satisfied (NO in step S173), the CPU returns the processing to be performed to step S131.

On the other hand, when it is determined that the condition to end is satisfied (YES in step S173), the CPU returns the processing to be performed to step S130 in the main processing from which this shooting processing has been called.

Figure 9:
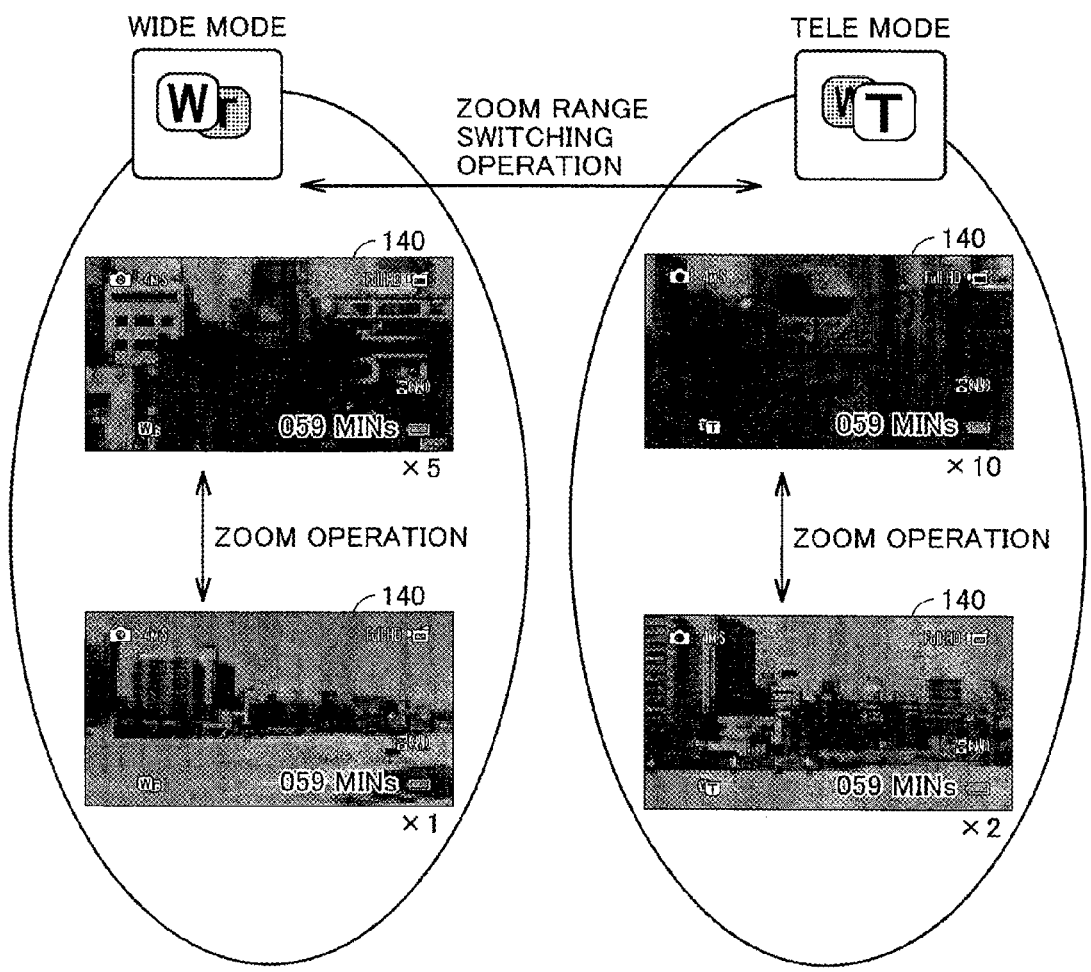
FIG. 9 is a diagram showing an example of an image obtained by the image pick-up apparatus in this embodiment.

FIG. 9 is a diagram showing an example of an image obtained by image pick-up apparatus 100 in this embodiment. Referring to FIG. 9, as the user operates zoom range button 131 to perform a zoom range switching operation so that the zoom range is switched to a wide mode, that is, wide-angle, a screen on the left in FIG. 9 is displayed on display portion 140.

When the zoom range is set to the wide mode, the Wide icon indicating the wide mode is displayed in a lower left portion of the screen displayed on display portion 140, as described in connection with step S158 in FIG. 8.

Then, as the user operates zoom switch 133 to perform a zoom operation in the wide mode, the zoom factor is changed in a range from 1× to 5×.

Figure 10:
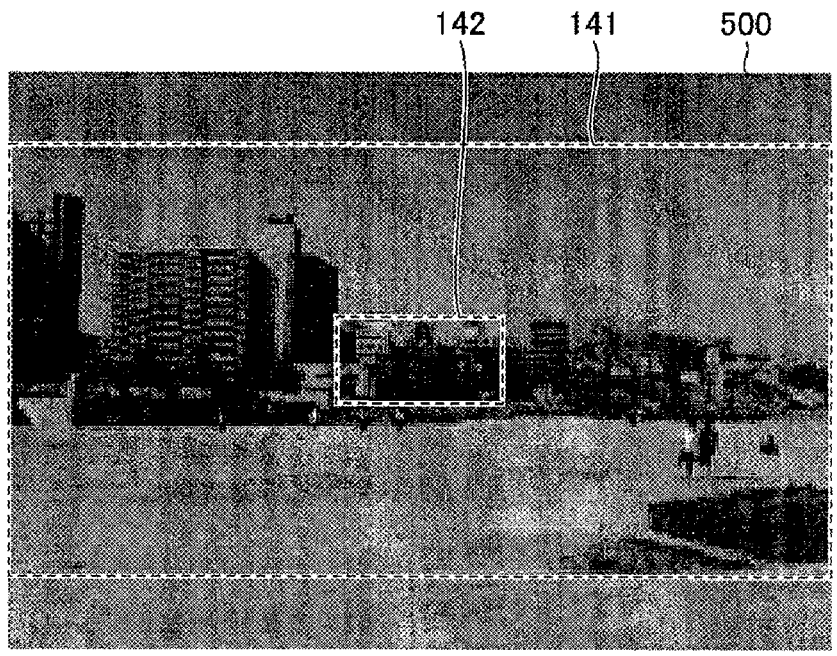
FIG. 10 is a first diagram showing a range of the image obtained by the image pick-up apparatus in this embodiment.

FIG. 10 is a first diagram showing a range of the image obtained by image pick-up apparatus 100 in this embodiment. Referring to FIG. 10, as the zoom factor is changed in the wide mode, a shot image is zoomed in a range from a frame 141 to a frame 142 of a landscape 500.

Referring back to FIG. 9, as the user operates zoom range button 131 to perform the zoom range switching operation so that the zoom range is switched to the tele mode, that is, telephoto, the screen on the right in FIG. 9 is displayed on display portion 140.

When the zoom range is set to the tele mode, the Tele icon indicating the tele mode is displayed in a lower left portion of the screen displayed on display portion 140, as described in connection with step S155 in FIG. 8.

Then, as the user operates zoom switch 133 to perform a zoom operation in the tele mode, the zoom factor is changed in a zoom range from 2× to 10×, that is, twice that in the wide mode.

Figure 11:
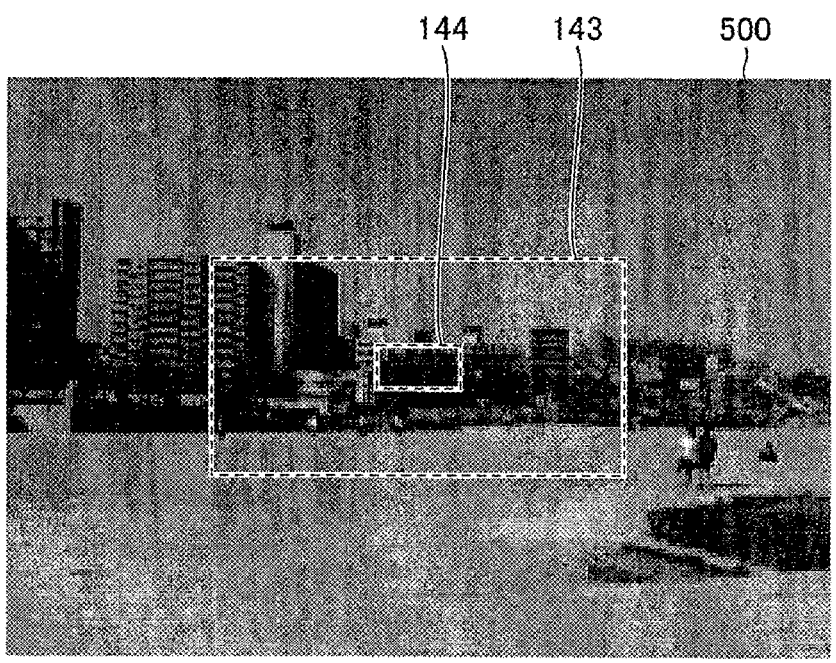
FIG. 11 is a second diagram showing a range of the image obtained by the image pick-up apparatus in this embodiment.

FIG. 11 is a second diagram showing a range of the image obtained by image pick-up apparatus 100 in this embodiment. Referring to FIG. 11, as the zoom factor is changed in the tele mode, a shot image is zoomed in a range from a frame 143 to a frame 144 of landscape 500.

An effect of the embodiment described previously will now be described.

(1) Image pick-up apparatus 100 includes: image pick-up element 161 including an image sensor which outputs an electric signal indicating a value specifying a color for each pixel of an image formed by light incident on a light receiving surface constituted of a plurality of light receiving portions and having at least a first mode in which one charge is output per light receiving portion(s) as many as a square of a first number (for example, 1) among light receiving portions included in a first region of the light receiving surface and a second mode in which one charge is output per light receiving portions as many as a number calculated by multiplying the square of the first number by a square of a second number among light receiving portions included in a second region in a figure similar to the first region, at a scaling factor set to the second number (for example, twice); optical system 151 which guides light incident from the outside to the light receiving surface of image pick-up element 161; zoom range button 131 which accepts an operation to switch between wide-angle and telephoto; control portion 110 and image pick-up element control portion 160 which switch image pick-up element 161 to the second mode when an operation to switch to wide-angle is accepted by zoom range button 131 and switches image pick-up element 161 to the first mode when an operation to switch to telephoto is accepted; and control portion 110 and storage portion 120 which cause memory card 121 to store video image data based on the electric signal output from image pick-up element 161.

According to this feature, when the operation to switch to wide-angle is accepted by image pick-up apparatus 100, the electric signal in the first region in the image incident on the light receiving surface is output, and when the operation to switch to telephoto is accepted, the electric signal in the second region in a figure similar to the first region, at a scaling factor set to the second number, in the image incident on the light receiving surface is output, with the number of pixels the same as the number of pixels in a case where switching to wide-angle has been made. Namely, the images represented by the electric signals output with wide-angle and telephoto being set are identical in the number of pixels, and the subject in the case of telephoto has a figure similar to the subject in the case of wide-angle, at a scaling factor set to the second number.

Consequently, image pick-up apparatus 100 capable of switching between wide-angle and telephoto in a simplified manner can be provided. In addition, since a scaling factor of the subject can be set to a scaling factor set to the second number simply by performing an operation to switch to telephoto, dynamic switching between wide-angle and telephoto can be made in a simplified manner.

(2) Preferably, optical system 151 can change a zoom factor for zooming in an image formed on the light receiving surface of image pick-up element 161 in a range from a scaling factor set to a third number (for example, ×1) to a scaling factor set to a fourth number (for example, ×5), image pick-up apparatus 100 further includes zoom switch 133 which accepts an operation to change the zoom factor, and optical system 151 changes the zoom factor in accordance with the operation accepted by zoom switch 133.

According to this feature, when the operation to switch to wide-angle is accepted by image pick-up apparatus 100, image information in the first region in the image incident on the light receiving surface as zoomed in at the zoom factor in a range from the scaling factor set to the third number to the scaling factor set to the fourth number is output, and when the operation to switch to telephoto is accepted, image information in the second region in a figure similar to the first region, at a scaling factor set to the second number, in the image incident on the light receiving surface as zoomed in at the zoom factor in a range from the scaling factor set to the third number to the scaling factor set to the fourth number is output. Namely, the images represented by the image information output with wide-angle and telephoto being set are identical in the number of pixels, and the zoom range in the case of wide-angle is in a range from the scaling factor set to the third number to the scaling factor set to the fourth number and the zoom range in the case of telephoto is in a range from the scaling factor calculated by multiplying the third number by the second number (for example, ×2) to the scaling factor calculated by multiplying the fourth number by the second number (for example, ×10).

Consequently, according to image pick-up apparatus 100, switching of the zoom range between a wide-angle range and a telephoto range can be made in a simplified manner. In addition, according to image pick-up apparatus 100, unless an operation to switch to wide-angle or telephoto is performed, the mode of image pick-up element 161 is not switched. Therefore, production of a discontinuous point due to mode switching of image pick-up element 161 in zooming within the zoom range can be prevented and a seamless zoom function can be provided.

(3) Preferably, image pick-up element 161 outputs, in the first mode, one electric signal indicating an added value of values indicated by charges of the light receiving portions included in the light receiving portions as many as the square of the first number, and outputs, in the second mode, one electric signal indicating an added value of values indicated by charges of the light receiving portions included in the light receiving portions as many as the number calculated by multiplying the square of the first number by the square of the second number.

According to the present invention, as compared with a case where any value indicated by charge(s) included in light receiving portion(s) as many as the square of the first number and as many as the number calculated by multiplying the square of the first number by the square of the second number is output, an amount of information per one pixel can be the square of the first number. Consequently, sensitivity can be improved.

(4) Preferably, the first region is a rectangular region including H×V (for example, 1920×1080) light receiving portions, the second region is a rectangular region including nH×nV (for example, 3840×2160) light receiving portions, and the first region and the second region are identical in a central point.

(5) An image pick-up method is performed by image pick-up apparatus 100 including image pick-up element 161 including an image sensor which outputs an electric signal indicating a value specifying a color for each pixel of an image formed by light incident on a light receiving surface constituted of a plurality of light receiving portions and having at least a first mode in which one charge is output per light receiving portion(s) as many as a first number among light receiving portions included in a first region and a second mode in which one charge is output per light receiving portions as many as a number calculated by multiplying the first number by a square of a second number among light receiving portions included in a second region in a figure similar to the first region, at a scaling factor set to the second number, optical system 151 which guides light incident from the outside to the light receiving surface of image pick-up element 161, and control portion 110 and storage portion 120 which cause memory card 121 to store video image data based on the electric signal output from image pick-up element 161, and the method includes the steps of accepting an operation to switch between wide-angle and telephoto, and switching image pick-up element 161 to the second mode when an operation to switch to wide-angle is accepted and switching image pick-up element 161 to the first mode when an operation to switch to telephoto is accepted.

According to this feature, an image pick-up method capable of switching between wide-angle and telephoto in a simplified manner can be provided. In addition, since the subject can be in a similar figure at the scaling factor set to the second number simply by performing the operation to switch to telephoto, dynamic switching between wide-angle and telephoto can be made.

A variation of the embodiment described above will now be described.

(1) In the embodiment described previously, not only the zoom range can be switched to wide-angle or telephoto but also zoom within the zoom range is allowed. The embodiment, however, is not limited as such, and the configuration may be such that an angle of view can be switched to wide-angle or telephoto but zoom is not allowed in each angle of view.

(2) In the embodiment described previously, as described with reference to FIG. 3, as the program is executed by the CPU of control portion 110, zoom control portion 111, drive mode switching portion 112, shooting start and stop control portion 113, and the like are implemented in the versatile CPU of control portion 110. The embodiment, however, is not limited as such, and dedicated hardware implementing functions of zoom control portion 111, drive mode switching portion 112, shooting start and stop control portion 113, and the like may be included in control portion 110.

(3) In the embodiment described previously, in the case of pixel mixture, a voltage signal resulted from pixel mixture in image pick-up element 161 is output. The embodiment, however, is not limited as such, and after a voltage signal is output from image pick-up element 161, pixels may be mixed based on that electric signal. For example, a voltage signal corresponding to charge for each light receiving portion output from image pick-up element 161 may be subjected to AD conversion by AD conversion portion 171 and thereafter pixels may be mixed in video image processing portion 170.

(4) In the embodiment described previously, as in pixel mixture, pixel mixture for outputting a voltage corresponding to added charges of n×n (n=2) light receiving portions is carried out. The embodiment, however, is not limited as such, and other methods may be adopted so long as a voltage signal corresponding to a representative value of charges of n×n light receiving portions is output.

For example, in the present embodiment, added charges of n×n (n=2) light receiving portions have been adopted as the representative value, however, an average value of charges of n×n light receiving portions may be adopted. Alternatively, a value of charge of one representative light receiving portion among n×n light receiving portions may be adopted. This case corresponds to output of charge, with n×n light receiving portions having been thinned out to one light receiving portion.

(5) Alternatively, addition of pixels of n light receiving portions in a vertical direction may be performed and n light receiving portions in a horizontal direction may be thinned out to one light receiving portion, so that a voltage signal corresponding to a representative value of charges of n×n light receiving portions is consequently output. Similarly, addition of pixels of n light receiving portions in a horizontal direction may be performed and n light receiving portions in a vertical direction may be thinned out to one light receiving portion, so that a voltage signal corresponding to a representative value of charges of n×n light receiving portions is consequently output.

In addition, in a case where pixels are added only in a vertical direction while thinning out is performed with regard to a horizontal direction and a case where pixels are added only in a horizontal direction while thinning out is performed with regard to a vertical direction, one of thinning out and addition of pixels may be performed by image pick-up element 161 and the other thereof may be performed, for example, by video image processing portion 170 after an electric signal is output from image pick-up element 161.

(6) In the embodiment described previously, it is assumed that the first mode is the cut-out mode in which charges of light receiving portions in H×V regions are output as the electric signal and the second mode is the 4-pixel mixed mode in which charges of light receiving portions in 2H×2V regions as added every 2-square light receiving portions are output as the electric signal.

The embodiment, however, is not limited as such, and the first mode may be the cut-out mode of the H×V regions and the second mode may be an n-square-pixel mixed mode (n=3, 4, . . . ) in which charges of light receiving portions in nH×nV regions as added every n light receiving portions are output as the electric signal. Alternatively, the first mode may be an m-square-pixel mixed mode (m=2, 3, . . . ) and the second mode may be an (m×n)-square-pixel mixed mode (n=2, 3, . . . ).

(7) In the embodiment described previously, the zoom range is switched between two of wide-angle and telephoto. The embodiment, however, is not limited as such, and the zoom range may be switched among three or more.

For example, depending on switching of the zoom range, switching from a first angle of view to a third angle of view may be made, with the first angle of view being telephoto as compared with a second angle of view and the second angle of view being telephoto as compared with the third angle of view. The drive mode of image pick-up element 161 may be switched to the cut-out mode of the H×V regions when the first angle of view is set, it may be switched to an m-square-pixel mixed mode (m=2, 3, . . . ) when the second angle of view is set, and it may be switched to an n-square-pixel mixed mode (n=3, 4, . . . , m<n) when the third angle of view is set.

(8) The present invention can be understood as the invention of image pick-up apparatus 100, the invention of an image pick-up method performed in image pick-up apparatus 100, the invention of a program for image pick-up processing performed in image pick-up apparatus 100, and the invention of a computer-readable recording medium recording the program.

The computer-readable recording medium may be a recording medium carrying a program in a fixed manner, including a magnetic disk such as a magnetic tape, a cassette tape, a flexible disk, and a hard disk, an optical disk such as a CD-ROM (Compact Disk Read Only Memory) and a DVD (Digital Versatile Disk), a magneto-optical disk such as an MO (Magneto Optical disk) and an MD (trademark) (Mini-Disc), a memory card such as an IC card and an optical card, or a semiconductor memory such as a mask ROM, an EPROM (Erasable Programmable Read Only Memory), an EEPROM (Electronically Erasable and Programmable Read Only Memory), and a flash ROM, or may be a medium carrying a program in such a fluid manner as downloading the program through a network.

(9) Although the present invention has been described and illustrated in detail, it is clearly understood that the same is by way of illustration and example only and is not to be taken by way of limitation, the scope of the present invention being interpreted by the terms of the appended claims.

What is claimed is:

1. An image pick-up apparatus, comprising:
   an image processing portion including an image sensor which outputs pixel information of a color for each pixel of an image formed by light incident on a light receiving surface constituted of a plurality of light receiving portions and having at least a first mode in which one piece of pixel information is output per light receiving portion(s) as many as a square of a first number among light receiving portions included in a first region of the light receiving surface and a second mode in which one piece of pixel information is output per light receiving portions as many as a number calculated by multiplying the square of said first number by a square of a second number among light receiving portions included in a second region in a figure similar to said first region, at a scaling factor set to the second number;
   an optical system which guides light incident from outside to said light receiving surface of said image processing portion;
   a switching operation portion which accepts an operation to switch between wide-angle and telephoto;
   a control portion which switches said image processing portion to said second mode when an operation to switch to said wide-angle is accepted by said switching operation portion and switches said image processing portion to said first mode when an operation to switch to said telephoto is accepted; and an output portion which outputs image information based on said pixel information output from said image processing portion to a recording medium or to the outside.

2. The image pick-up apparatus according to claim 1, wherein
said optical system can change a zoom factor for zooming in an image formed on said light receiving surface of said image processing portion in a range from a scaling factor set to a third number to a scaling factor set to a fourth number,
said image pick-up apparatus further comprises a zoom operation portion which accepts an operation to change said zoom factor, and
said optical system changes said zoom factor in accordance with the operation accepted by said zoom operation portion.

3. The image pick-up apparatus according to claim 1, wherein
said image processing portion outputs, in said first mode, one piece of pixel information indicating an added value of values indicated by said pixel information of said light receiving portions included in said light receiving portions as many as the square of said first number, and outputs, in said second mode, one piece of pixel information indicating an added value of values indicated by said pixel information of said light receiving portions included in said light receiving portions as many as the number calculated by multiplying the square of said first number by the square of said second number.

4. The image pick-up apparatus according to claim 1, wherein
said first region is a rectangular region including H×V said light receiving portions,
said second region is a rectangular region including nH×nV said light receiving portions, and
said first region and said second region are identical in a central point.

5. An image pick-up method performed by an image pick-up apparatus including an image processing portion including an image sensor which outputs pixel information indicating a value specifying a color for each pixel of an image formed by light incident on a light receiving surface constituted of a plurality of light receiving portions and having at least a first mode in which one piece of pixel information is output per light receiving portion(s) as many as a square of first number among light receiving portions included in a first region of the light receiving surface and a second mode in which one piece of pixel information is output per light receiving portions as many as a number calculated by multiplying the square of said first number by a square of a second number among light receiving portions included in a second region in a figure similar to said first region, at a scaling factor set to the second number, an optical system which guides light incident from outside to said light receiving surface of said image processing portion, and an output portion which outputs image information based on said pixel information output from said image processing portion to a recording medium or to the outside, comprising the steps of:
accepting an operation to switch between wide-angle and telephoto; and
switching said image processing portion to said second mode when an operation to switch to said wide-angle is accepted and switching said image processing portion to said first mode when an operation to switch to said telephoto is accepted.

* * * * *